(12) United States Patent
Hum et al.

(10) Patent No.: US 8,671,754 B2
(45) Date of Patent: Mar. 18, 2014

(54) SENSOR DEVICE

(71) Applicant: Agency for Science, Technology and Research, Singapore (SG)

(72) Inventors: Allen Hum, Singapore (SG); Man I Lei, Singapore (SG); Julius Ming Lin Tsai, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/629,911

(22) Filed: Sep. 28, 2012

(65) Prior Publication Data

US 2013/0086989 A1    Apr. 11, 2013

(30) Foreign Application Priority Data

Sep. 28, 2011    (SG) ................................ 201107048-9

(51) Int. Cl.
*G01D 11/24* (2006.01)
*G01L 19/14* (2006.01)
*G01P 1/02* (2006.01)
*G01L 19/04* (2006.01)

(52) U.S. Cl.
USPC ............................................... 73/431; 73/708

(58) Field of Classification Search
USPC ...................................................... 73/431, 708
See application file for complete search history.

(56) References Cited

U.S. PATENT DOCUMENTS

| | | | |
|---|---|---|---|
| 7,562,580 B2 * | 7/2009 | Rezgui et al. | 73/716 |
| 7,752,915 B2 * | 7/2010 | Holzheu | 73/756 |
| 7,775,119 B1 * | 8/2010 | Suminto et al. | 73/727 |
| 2013/0214370 A1 * | 8/2013 | Hussain et al. | 257/420 |

\* cited by examiner

*Primary Examiner* — Lisa Caputo
*Assistant Examiner* — Jamel Williams
(74) *Attorney, Agent, or Firm* — K. David Crockett, Esq.; Niky Economy Syrengelas, Esq.; Crockett & Crockett, PC

(57) ABSTRACT

In various embodiments, a sensor device is provided. The sensor includes a sensor receiving portion, a sensor arranged in the sensor receiving portion and a cap covering the sensor and the sensor receiving portion. The cap includes a plurality of recesses in the inner side wall of the cap for reducing the pressure measured by the sensor.

21 Claims, 12 Drawing Sheets

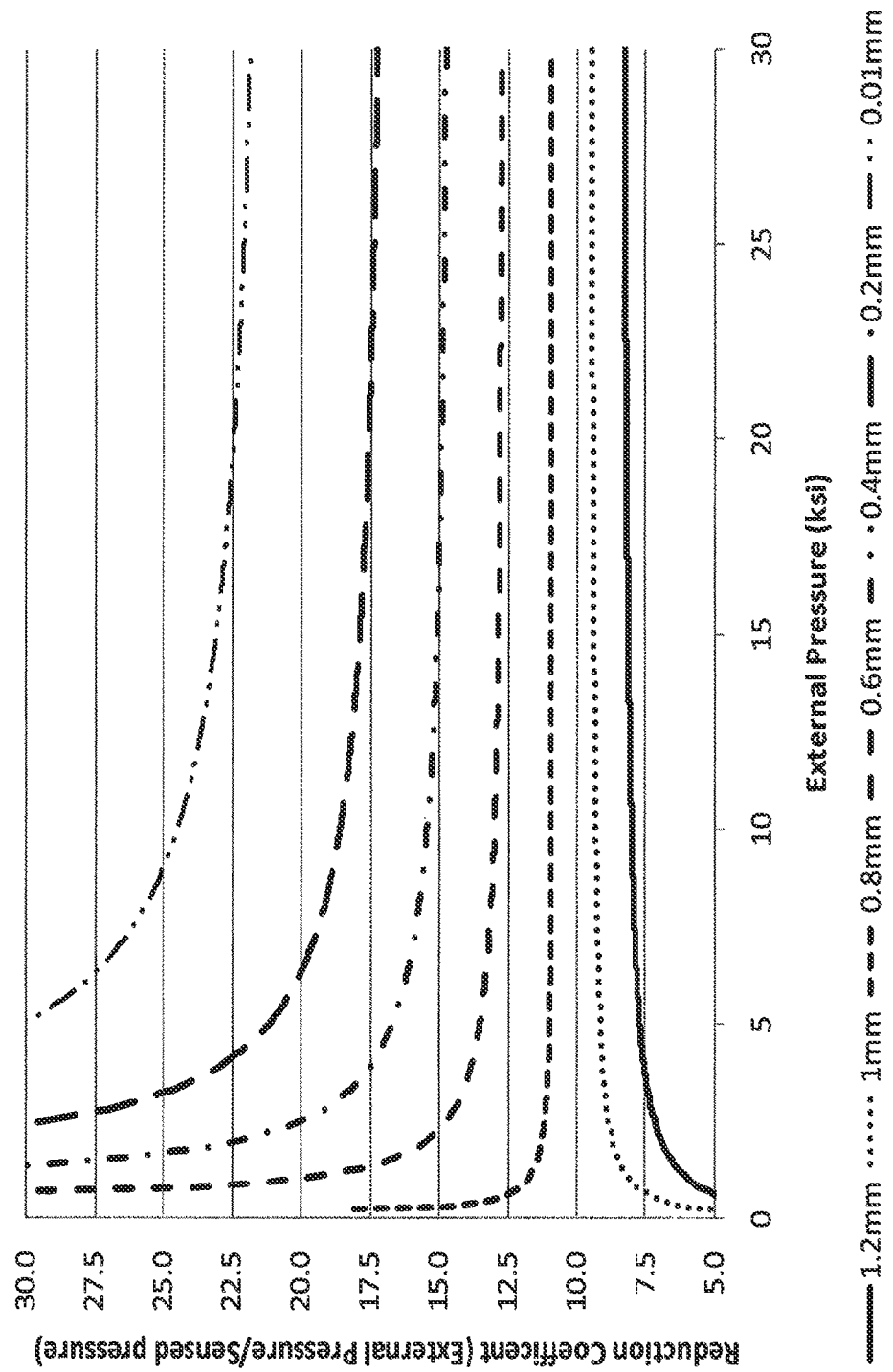

SENSOR DEVICE

CROSS-REFERENCE TO RELATED APPLICATIONS

This application claims the benefit of priority of SG application No. 201107048-9 filed Sep. 28, 2011, the contents of which are incorporated herein by reference for all purposes.

TECHNICAL FIELD

The present invention relates to sensor devices.

BACKGROUND

In oil and gas industry, hydrocarbon exploration has recently become more intense, and exploration has been shifting towards evaluation of deeper, horizontal, multi lateral and branched reservoirs. To enable the exploration and production of "advance" oil or gas wells, there is a need for new technological devices for measurement and control. Challenges include the need for such devices to withstand the evaluated temperature and pressure environments as the depth and complexity of exploration increases. For instance, it has been estimated that the operating environment for deep gas drilling in Gulf of Mexico has a temperature of 316° C. and a pressure of 30,450 pound-force per square inch (psi).

Current electronic devices face limitations in operating under such harsh environments. For instance, a sensor has been developed to operate at 500° C. but faces a limitation of only being able to operate up to a pressure of 600 psi. Another sensor developed can operate at 30,000 psi but only up to 260° C. Both of these sensors may not be able to withstand the evaluated temperature and pressure in many environments as the depth and complexity of exploration increases.

Also, many conventional devices may not provide an accurate reading of the external environment. In many situations, the ratio of the actual external pressure of the environment to the sensed pressure fluctuates greatly and non-linearly over the wide range of external pressures that such devices are expected to operate in. As a result, the external pressure cannot be calculated or extrapolated accurately based on the sensed pressure.

Thus, there is a need to provide an improved sensor device that is able to address at least partially the abovementioned challenges.

SUMMARY OF THE INVENTION

In various embodiments, sensor device is provided, including a sensor receiving portion; and a sensor arranged in the sensor receiving portion; and a cap covering the sensor and the sensor receiving portion, wherein the cap includes a plurality of recesses in an inner side wall of the cap.

BRIEF DESCRIPTION OF THE DRAWINGS

The invention will be better understood with reference to the detailed description when considered in conjunction with the non-limiting examples and the accompanying drawings, in which:

FIG. 4b is a graph showing simulation results of the various embodiments illustrated in FIG. 3 when the widths of all the rings in the concentric ring arrangement are varied from 0.01 mm to 1.2 mm. The graph shows the reduction coefficient plotted against external pressure.

DETAILED DESCRIPTION OF THE INVENTION

Figure 1A:
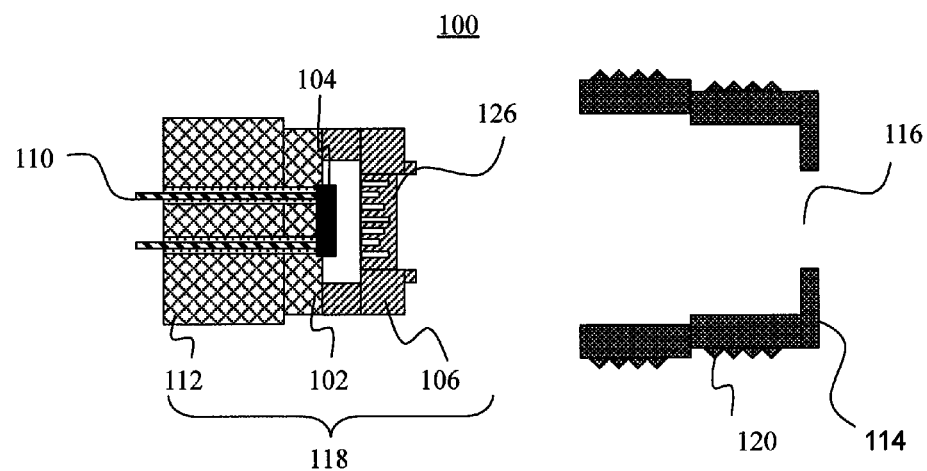
FIG. 1 is a sideview cross-sectional schematic diagram illustrating a sensor device according to various embodiments when (a) the sleeve has not been assembled with the remaining sensor device (b) the sleeve has been assembled with the remaining sensor device

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

FIG. 1 shows a sensor device 100, including a sensor receiving portion 102. A sensor 104 arranged in the sensor receiving portion 102 and a cap 106 covers the sensor 104 and the sensor receiving portion 102, wherein the cap 106 includes a plurality of recesses 108 in the inner side wall of the cap 106 according to various embodiments.

The sensor 104 may be shielded from the external environment by the sensor receiving portion 102 and the cap 106. As such, the sensor 104 may be protected from damage from the elevated external pressure under operating conditions. A fraction of the external pressure is transmitted through the cap 106 and sensed by the sensor 104. The ratio of the external pressure of the external environment to the sensed pressure sensed by the sensor device 100 is provided as the reduction coefficient, i.e.

$$\text{Reduction Coefficient} = \text{External Pressure/Sensed Pressure.} \quad (1)$$

The plurality of recesses 108 in the inner wall of the cap helps to reduce the non-linearity of the reduction coefficient over a desired range of external pressure. The plurality of recesses 108 may also reduce the external pressure as it transmits through the plurality of recesses 108 in the cap 106 to the sensor 104. As such, the sensed pressure detected by the sensor 104 is lower than the external pressure. In this manner, the sensor device 100 is able to provide improved sensing in harsh environments having elevated temperature and pressure.

The cap 106 may include one or more elements, each having a shape selected from the group: circle, triangle, square and rectangle, being at least a part of the plurality of recesses 108. In other words, each recess or part of each recess of the plurality of recesses 108 may be circular, triangular, square or rectangular. The sensor 104 may be a pressure sensor or a force sensor. Non-limiting examples of pressure sensors include capacitive pressure sensors, piezoelectric pressure sensors, piezoresistive strain gauges, optical pressure sensors and electromagnetic pressure sensors. The sensor 104 may include of silicon.

In addition to protection from elevated pressure, the sensor receiving portion 102 and the cap 106 may provide other protection such as protection from corrosion. Suitable materials for the cap 106 and the receiving portion 102 may have low heat conductivities and high yield strength. The cap 106 may be made of material with yield strength above 185,200 psi and thermal conductivity below 7.50 Wm-K. Choosing a low thermal conductivity material for the cap 106 and the receiving portion 102 allows the cap 106 and the receiving portion 102 to better insulate the sensor 104 from the elevated temperature of the environment. Choosing a material with high yield strength allows for linear operation of the cap 106 and allows repeatable use of sensor device 100 at high pressures. The cap 106 may include or may be made of titanium beta 21, titanium beta alloys or other suitable materials. The receiving portion 102 may include of metallic alloys or ceramic material such as iron-nickel alloys, titanium carbide, silicon carbide or other suitable materials. In various embodiments, the metallic alloys or ceramic material match the coefficient of thermal expansion (CTE) of silicon.

The sensor device 100 may further include electrical connections 110 connecting the sensor 104 to an external device (not shown). The electrical connections 110 may transmit signals indicating the sensed pressure from the sensor 104 to the external device. The electrical connections may also provide power from a power source to the sensor 104. Various embodiments further provide a base 112 where the sensor receiving portion 102 is located. In various embodiments, the cap 106 is mounted on the sensor receiving portion 102 such that the cap 106 and the base 112 completely encapsulate the sensor 104.

The sensor device 100 may also further include a sleeve 114 in which the cap 106 and the sensor receiving portion 102 are disposed, the sleeve including an opening 116 such that a region including the plurality of recesses 108 may be released via the opening 116.

Figure 1B:
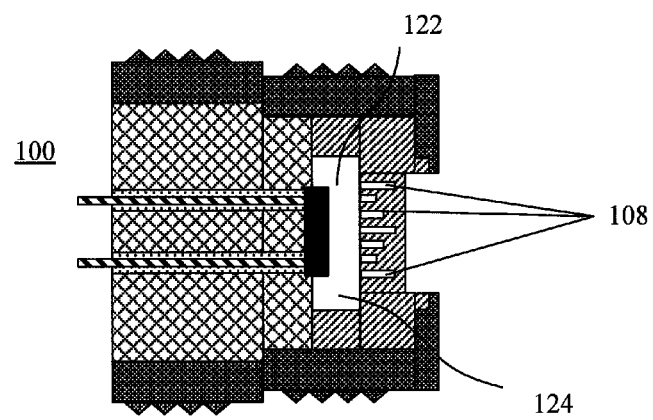

The base 112 may also be disposed in the sleeve 114. The inner housing 118 including the cap 106, the sensor receiving portion 102 and the base 112 may be inserted into the sleeve 114. FIG. 1a shows the sleeve 114 and the inner housing 118 before the inner housing 118 is inserted into the sleeve 114 according to various embodiments. FIG. 1b shows the sensor device 100 after the inner housing 118 is inserted into the sleeve 114 according to various embodiments.

The sleeve 114 serves to protect the sensor receiving portion 102. The sleeve 114 may be made of material having yield strength above 152,500 psi and be able to be brazed or welded to base 112. The sleeve 114 may include of stainless steel. Other non-limiting examples of suitable material for sleeve 114 include S306 steel, tool steel, titanium alloys and A512 steel.

The sleeve may have an outer surface including a screw thread 120. The screw thread 120 allows the sensor device to be mounted onto other equipment such as drilling tools.

The sleeve 114 may be joined to the inner housing 118 using an adhesive or blazing or a combination of both. In various embodiments, the adhesive is a high temperature adhesive. Various embodiments may provide that the sleeve 114 is joined to the inner housing using the high temperature adhesive and subsequently blazed to further secure the sleeve 114 to the inner housing 118. Choosing an appropriate method to join the sleeve 114 to the inner housing 118 as well as the appropriate material as the adhesive will ensure that the sleeve 114 is properly secured to the inner housing 118 and will not be separated from the inner housing 118 during operation of the sensor device 100.

In various embodiments, an enclosure 122 may be defined by the cap 106 and the sensor receiving portion 102. The sensor 104 may be contained in the enclosure 122. A damping fluid 124 may be provided in the enclosure 122 around the sensor 104. The enclosure 122 may be defined by the cap 106 and the sensor receiving portion 102 between the sensor 104 and a portion of the cap 106 such that the damping fluid 124 acts as the sensing medium.

The damping fluid 124 may have a viscosity in the range from about 50,000 mPa·s to about 1,000,000 mPa·s. Also, the damping fluid may be high temperature stable (up to 300° C.). The damping fluid 124 may include or consist of silicone oil.

Various embodiments provide that the cap may include a membrane 126 where the plurality of recesses 108 is located. The membrane 126 may provide the advantage of having structural flexibility in response to a varying external pressure.

In various embodiments, the recesses of the plurality of recesses 108 may have the same depth or different depths. In various embodiments, the recesses of the plurality of recesses 108 may the same width or have different widths. In various embodiments, the depth of one recess of the plurality of recesses 108 is different from the depth of another recess of the plurality of recesses 108. In various embodiments, the width of one recess of the plurality of recesses 108 is different from the width of another recess of the plurality of recesses 108.

In other words, the width or the depth or both the depth and the width of each recess of the plurality of recesses 108 may be different or may be the same from that of another recess of the plurality of recesses 108. The width or the depth or both the depth and the width of each recess of the plurality of recesses 108 is varied such that non-linearities of the reduction coefficient over a desired range of external pressure is reduced. As such, the external pressure can be calculated or extrapolated with greater accuracy over the desired range of external pressure based on the sensed pressure measured by the sensor 104 of the sensor device 100.

In various embodiments, the width of the recesses of the plurality of recesses may range from about 0.01 mm to about 1.2 mm or from about 0.8 mm to about 1.2 mm, or about 0.8 mm. In various embodiments, the depths of the recesses of the plurality of recesses may be in the range from about 0 mm to about 3 mm or from about 0.6 mm to about 3.0 mm from the cap surface.

Figure 2:
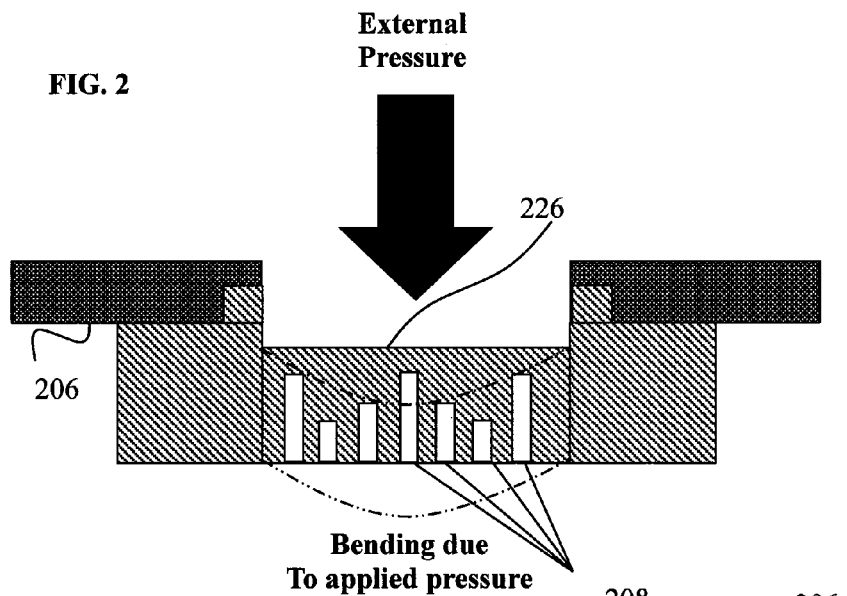
FIG. 2 is a sideview cross-sectional schematic diagram illustrating a portion of a sensor device according to various embodiments upon application of an external pressure.

FIG. 2 is a schematic diagram illustrating a portion of a sensor device having the cap 206 including the membrane 226 according to various embodiments upon application of an external pressure. As illustrated in FIG. 2, the membrane 226 may be configured to bend in the presence of the external pressure. In other words, the membrane 226 may be made less stiff than the remainder of the cap 206. The membrane 226 may be made less stiff than the remainder of the cap 206 by having a smaller thickness than the remainder of the cap 206 or by including a material than have a lower Young's modulus than the material of the remainder of the cap 206.

Various embodiments may provide that the membrane 226 include material that is different from the material of the remainder of the cap 206. In other various embodiments, the membrane 226 is of the same material as the remainder of the cap 206. The membrane 226 and the remainder of the cap 206 may also be a monolithic structure. In embodiments wherein the membrane 226 and the remainder of the cap 206 is a monolithic structure, the embodiments may have the advantages in terms of ease of manufacturing and/or design. Firstly, the need to cater for different thermal expansion due to different materials is reduced. Secondly, the need to find suitable joining methods or materials to join the membrane 226 and the remainder of the cap 206 which can withstand the elevated temperature and pressure is removed. Thirdly, the need to allow for fabrication tolerance to join two different materials is eliminated.

Figure 3:
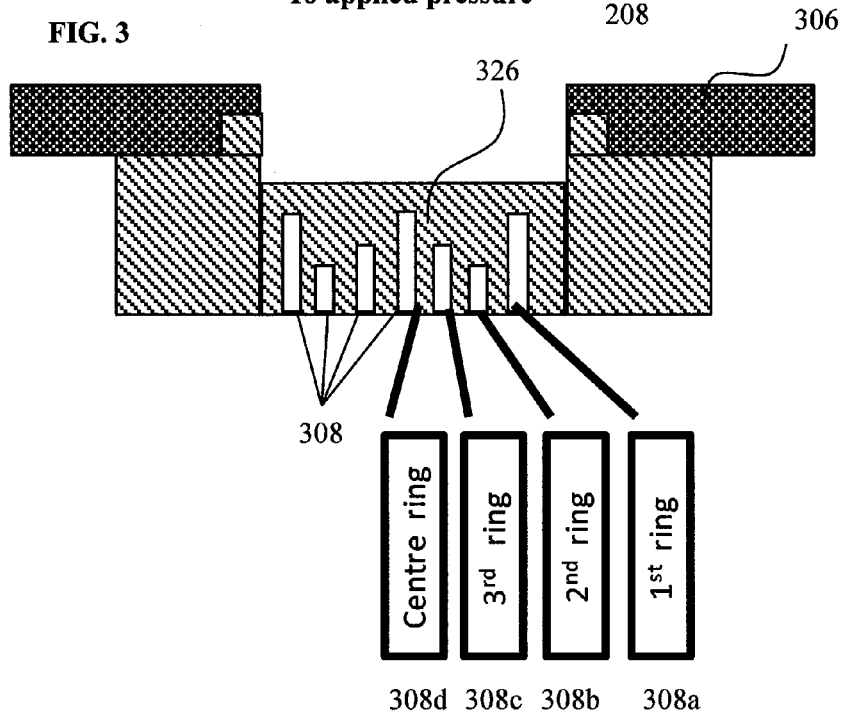
FIG. 3 is a sideview cross-sectional schematic diagram illustrating a portion of a sensor device having a concentric ring arrangement of four rings according to various embodiments.

FIG. 3 is a schematic diagram illustrating a portion of a sensor device having the cap 306 including the membrane 326 according to various embodiments.

The cap 306 may include at least one ring being at least a part of the plurality of recesses 308. The cap 306 may further include a concentric ring arrangement to which the at least one ring belongs being at least a part of the plurality of recesses 308. The embodiment shown in FIG. 3 has a concentric ring arrangement having four rings: first ring 308a, second ring 308b, third ring 308c and centre ring (or centre cylinder) 308d. However, it can be envisioned that alternative embodiments may have a ring arrangement having a different number of rings.

In various embodiments, the width of the at least one ring may be different from the width of another ring. In various embodiments, the depth of the at least one ring may be different from the depth of another ring. In various embodiments, the width of the at least one ring may be in the range from about 0.01 mm to about 1.2 mm or from about 0.8 mm to about 1.2 mm or about 0.8 mm. In various embodiments, the depth of the at least one ring may be in the range from about 0 mm to about 3 mm or from about 0.6 mm to about 3.0 mm from the cap surface.

In other words, the width or the depth or both the depth and the width of each ring may be different or may be the same from that of another ring. The width or the depth or both the depth and the width of each ring may be varied such that non-linearities of the reduction coefficient over a desired range of external pressure is reduced. As such, the external pressure can be calculated or extrapolated with greater accuracy over the desired range of external pressure based on the sensed pressure measured by the sensor 104 of the sensor device 100.

Figure 9:
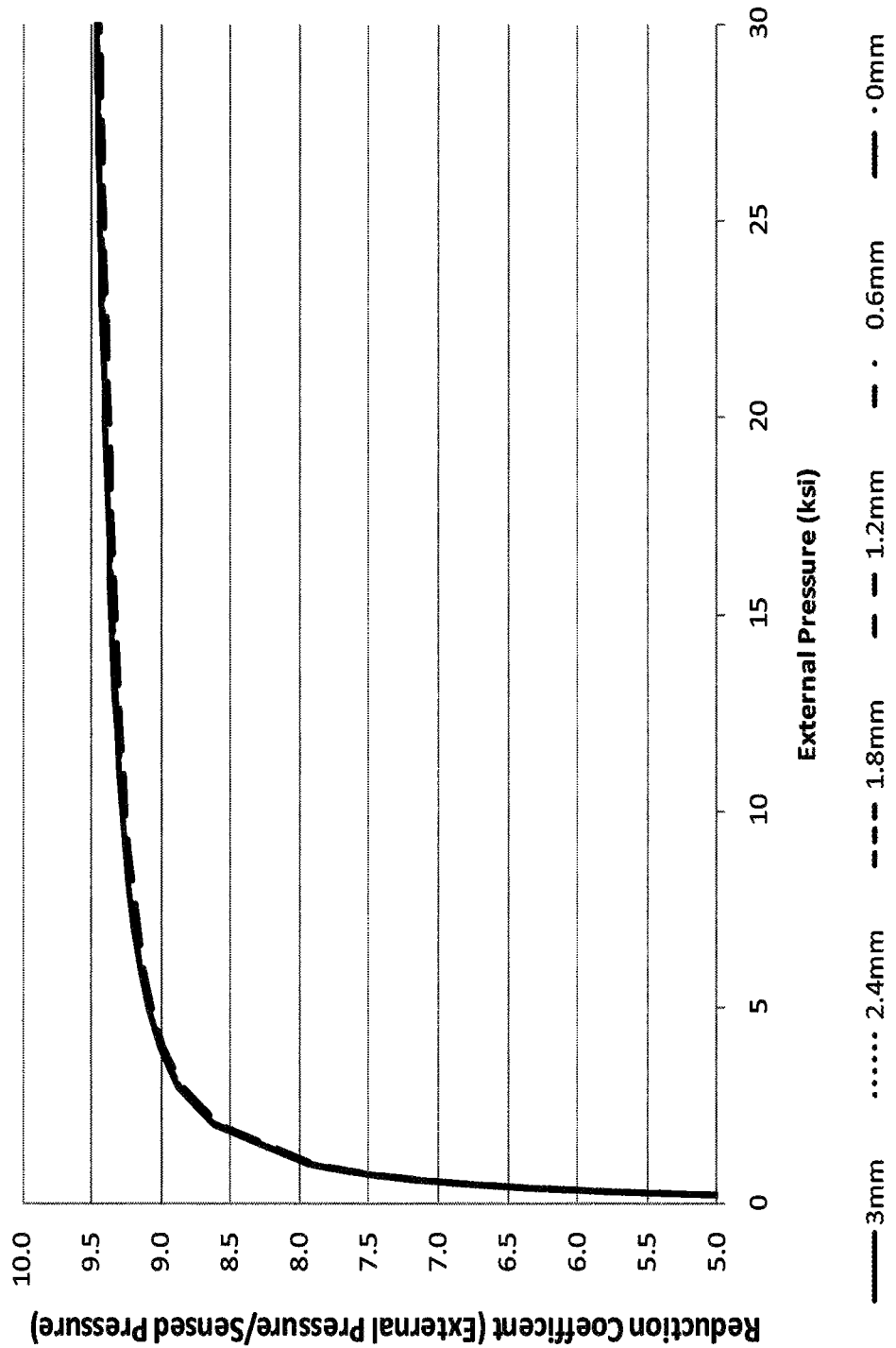
FIG. 9 is a graph showing simulation results of the various embodiments illustrated in FIG. 3 when the depth of only the centre ring (centre cylinder) in the concentric ring arrangement is varied from 0 mm to 3.0 mm. The graph shows the reduction coefficient plotted against external pressure.
Figure 10:
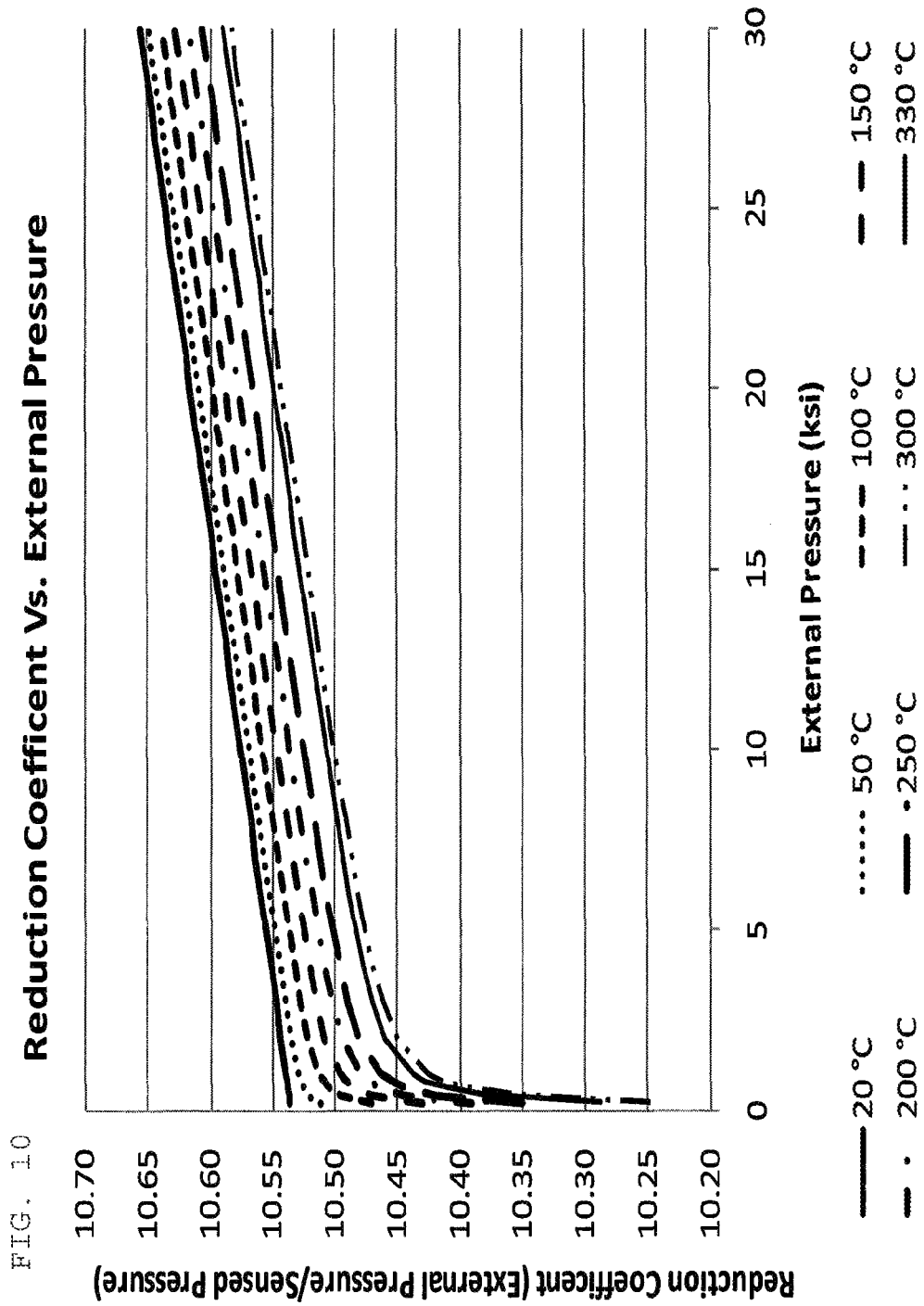
FIG. 10 is a graph showing simulation results of the various embodiments illustrated in FIG. 3 when the depths of the centre, third, second and first rings are 3.0 mm, 3.0 mm, 3.0 mm and 2.7 mm respectively and the widths of centre, third, second and first rings are 1.0 mm each. The graph shows the reduction coefficient plotted against external pressure.
Figure 11:
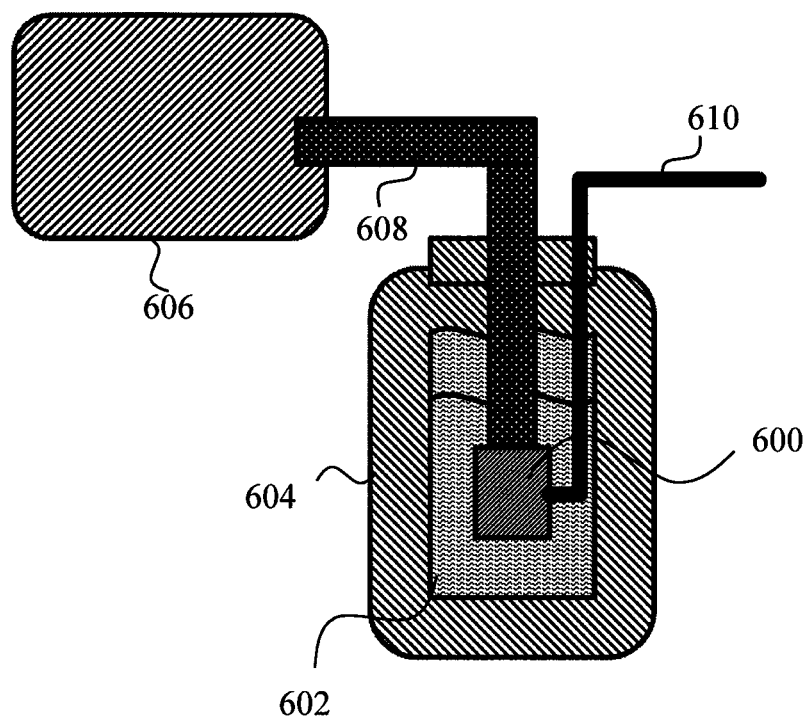
FIG. 11 is a sideview cross-sectional schematic diagram showing a setup for testing the sensor device.

FIGS. 4 to 11 show simulation results of the various embodiments using COSMOL Multiphysics software. The graphs in FIGS. 4 to 10 plot the reduction coefficient to the external pressure while the graph in FIG. 11 plots the reduction coefficient to the external pressure. The structural module is used to stimulate the compression stress due to external pressure on the membrane of the sensor device while the viscoelastic model is used to simulate the compression of the damping fluid by the deformation of the membrane 326. Simulation is carried using silicone oil as the damping fluid.

Figure 4A:
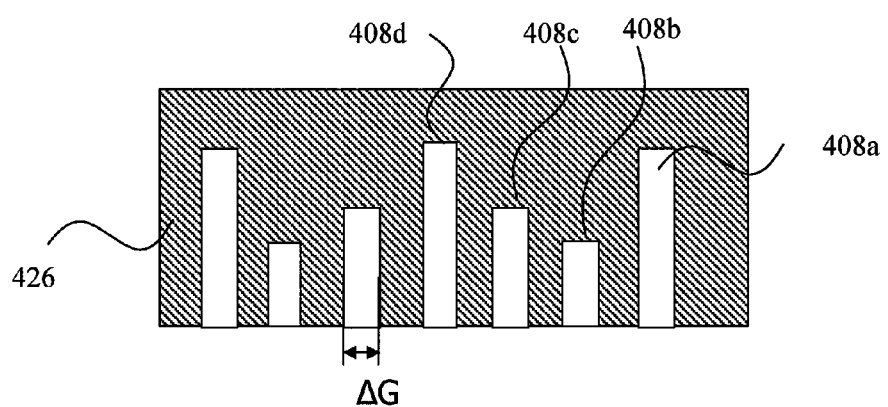
FIG. 4a is a cross-sectional schematic diagram illustrating a portion of the sensor device in FIG. 3.

FIG. 4a is a cross-sectional schematic diagram illustrating the membrane 326 in FIG. 3, denoted as 426 in FIG. 4a. The width of each of the four rings 408a, 408b, 408c and 408d is denoted by ΔG. FIG. 4b is a graph showing simulation results when the widths ΔG of all the rings 408a, 408b, 408c and 408d in the concentric ring arrangement are varied from 0.01 mm to 1.2 mm. The temperature is kept constant at about 300° C. FIG. 4 indicates that having a width of 0.8 mm provides the best linearity for external pressures below 1,000 psi. The reduction coefficient is about 11. Reducing the width from 0.6 mm to 0.01 mm causes the reduction coefficient to be largely non-linear at low pressure regimes.

Figure 5A:
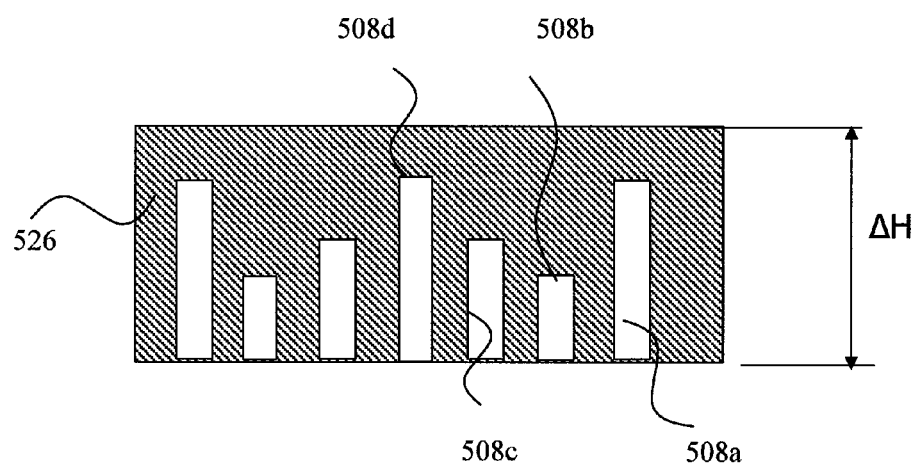
FIG. 5a is a cross-sectional schematic diagram illustrating a portion of the sensor device in FIG. 3.
Figure 5B:
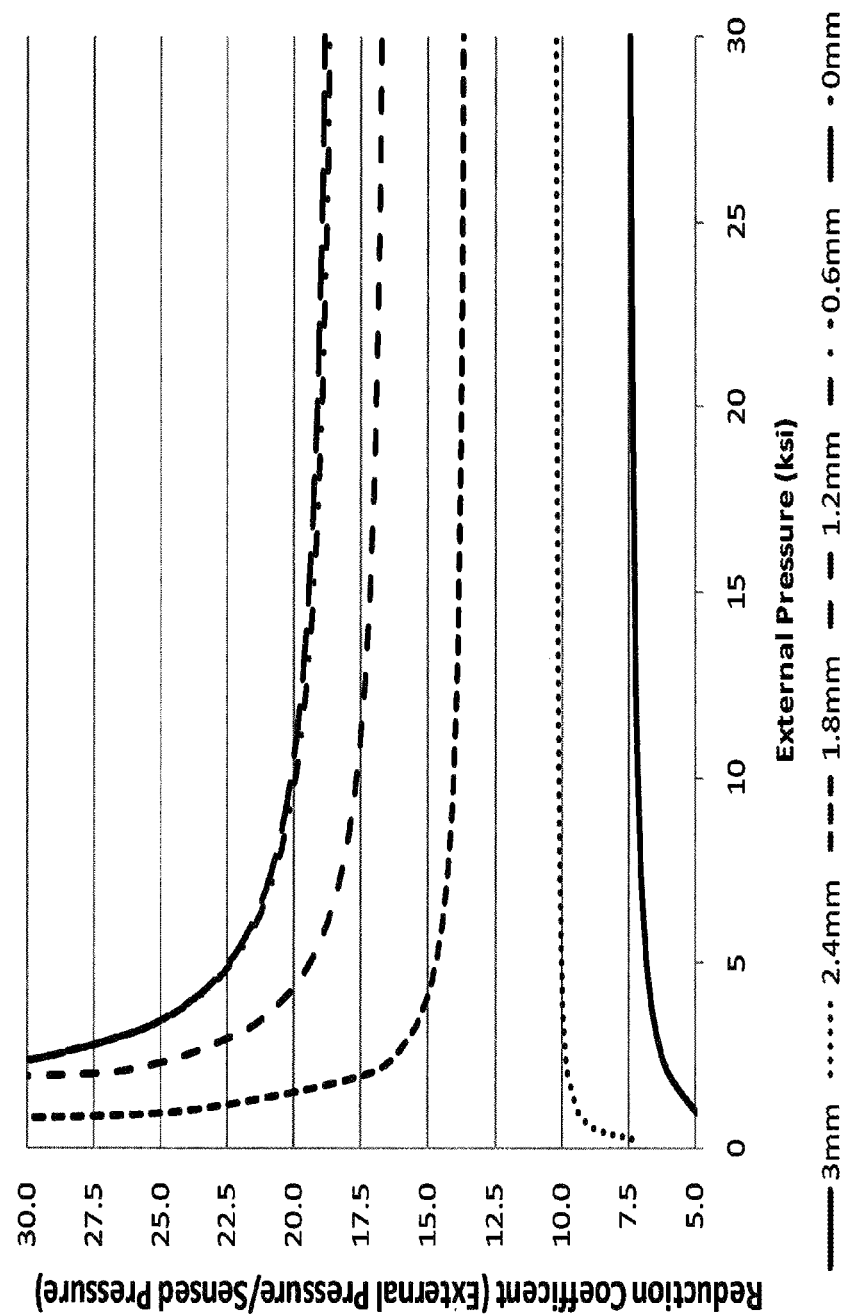
FIG. 5b is a graph showing simulation results of the various embodiments illustrated in FIG. 3 when the depths of all the rings in the concentric ring arrangement are varied from 0 mm to 3.0 mm. The graph shows the reduction coefficient plotted against external pressure.

FIG. 5a is a cross-sectional schematic diagram illustrating the membrane 326 in FIG. 3, denoted as 526 in FIG. 5a. The depth of each of the four rings 508a, 508b, 508c and 508d is denoted by ΔH. FIG. 5b is a graph showing simulation results when the depths ΔH of all the rings 508a, 508b, 508c and 508d in the concentric ring arrangement are varied from 0.01 mm to 1.2 mm. The temperature is kept constant at about 300° C. The reduction coefficient is high when the depths of the rings 508a, 508b, 508c and 508d are low showing that membrane 526 is stiffer when the depths of the rings 508a, 508b, 508c and 508d are low. Also, the non-linearity of the reduction coefficient is high for external pressure less than 15,000 psi.

Figure 6:
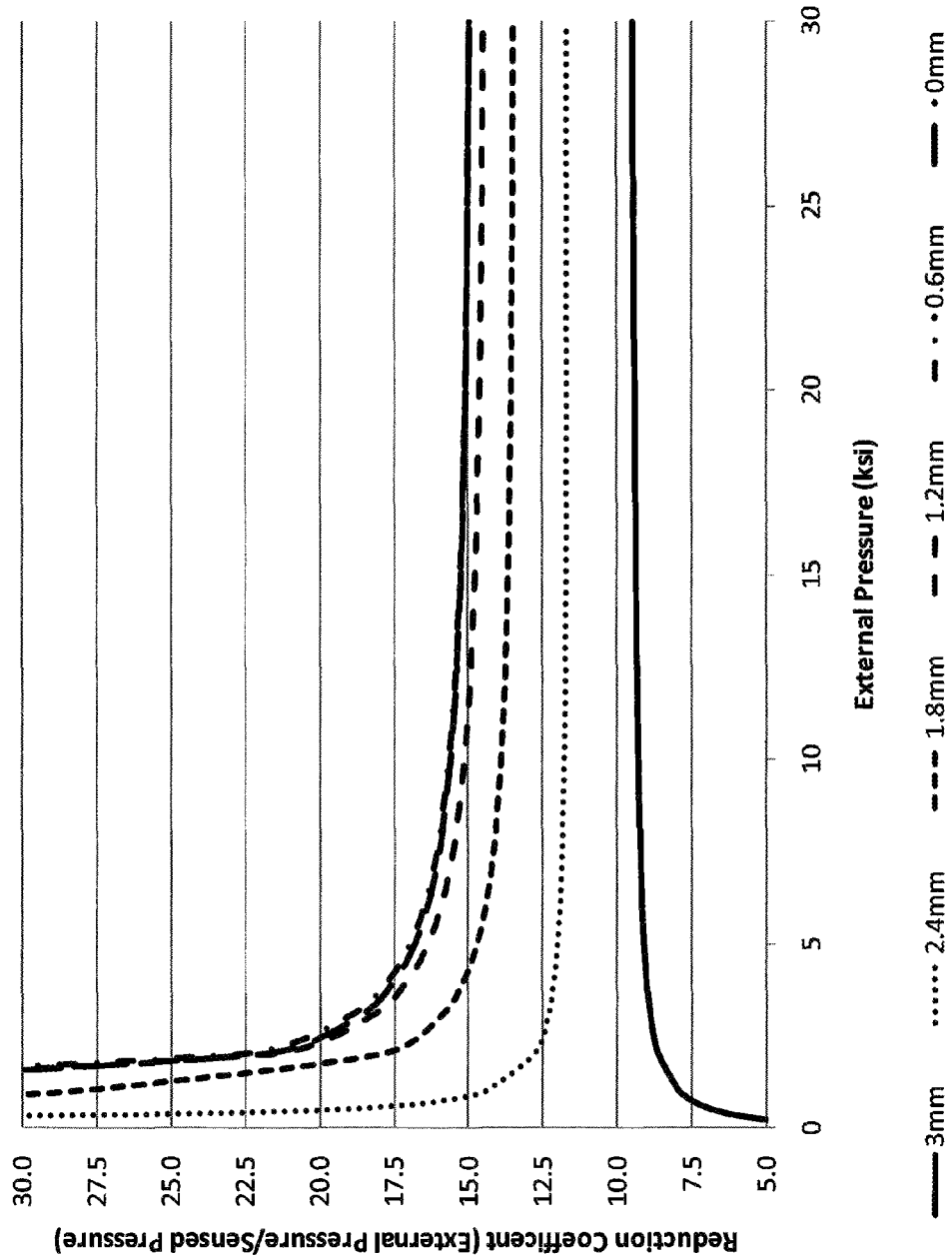
FIG. 6 is a graph showing simulation results of the various embodiments illustrated in FIG. 3 when the depth of only the first ring in the concentric ring arrangement is varied from 0 mm to 3.0 mm. The graph shows the reduction coefficient plotted against external pressure.

FIG. 6 is a graph showing simulation results of the various embodiments illustrated in FIG. 3 when the depth of only the first ring 308a, 408a and 508a in the concentric ring arrangement is varied from 0 mm to 3.0 mm. The depths of the remaining rings are maintained at 3.0 mm. The temperature is kept constant at about 300° C. The non-linearity of the reduction coefficient of rings at various depths is reduced compared to the reduction coefficient shown in FIG. 5b in which all the depths are varied.

Figure 7:
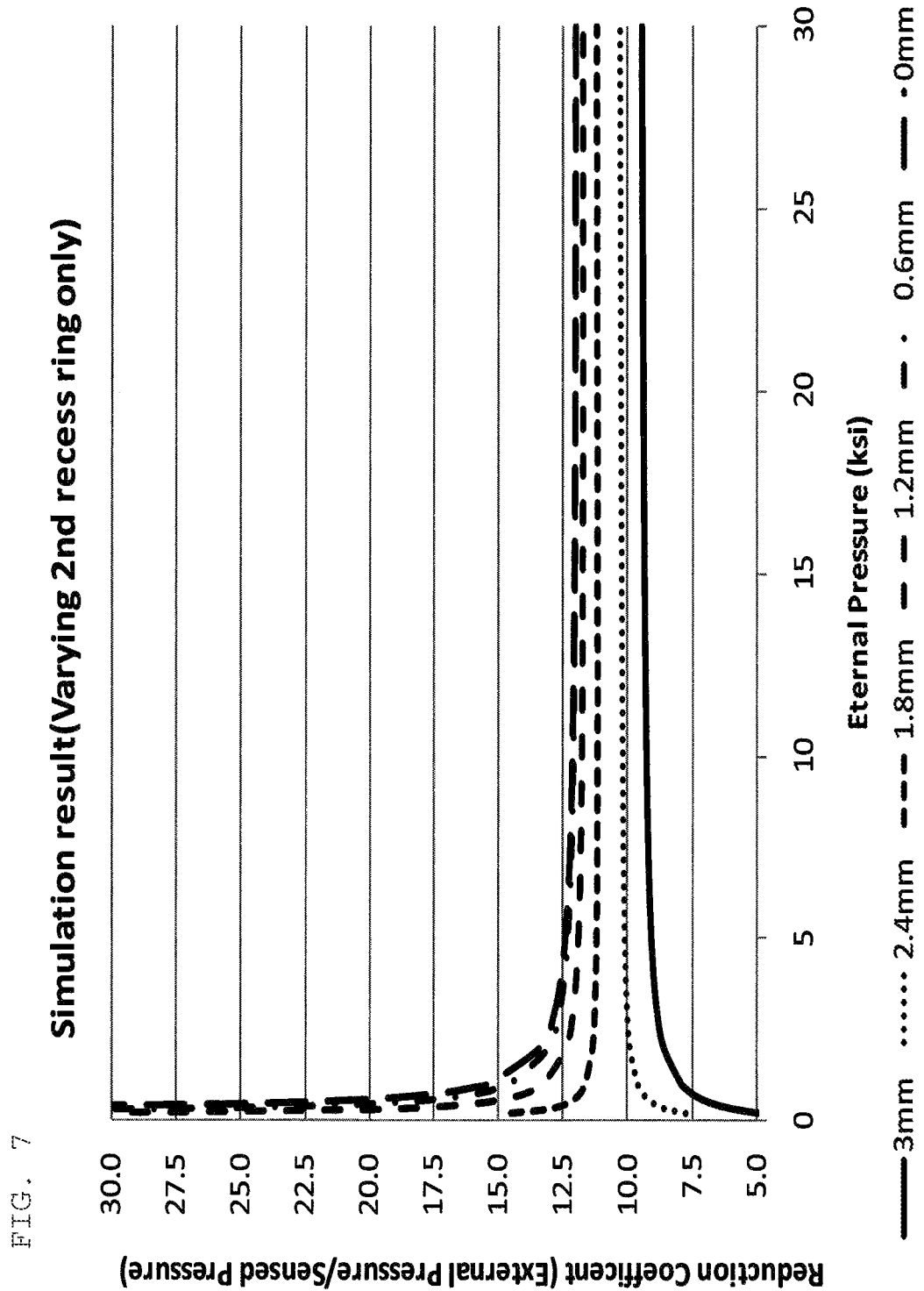
FIG. 7 is a graph showing simulation results of the various embodiments illustrated in FIG. 3 when the depth of only the second ring in the concentric ring arrangement is varied from 0 mm to 3.0 mm. The graph shows the reduction coefficient plotted against external pressure.

FIG. 7 is a graph showing simulation results of the various embodiments illustrated in FIG. 3 when the depth of only the second ring 308b, 408b and 508b in the concentric ring arrangement is varied from 0 mm to 3.0 mm. The depths of the remaining rings are maintained at 3.0 mm. The temperature is kept constant at about 300° C. The reduction coefficient increases when the depth of the second ring decreases. The non-linearity of the reduction coefficient of rings at various depths is further reduced compared to the reduction coefficient shown in FIGS. 5b and 6.

Figure 8:
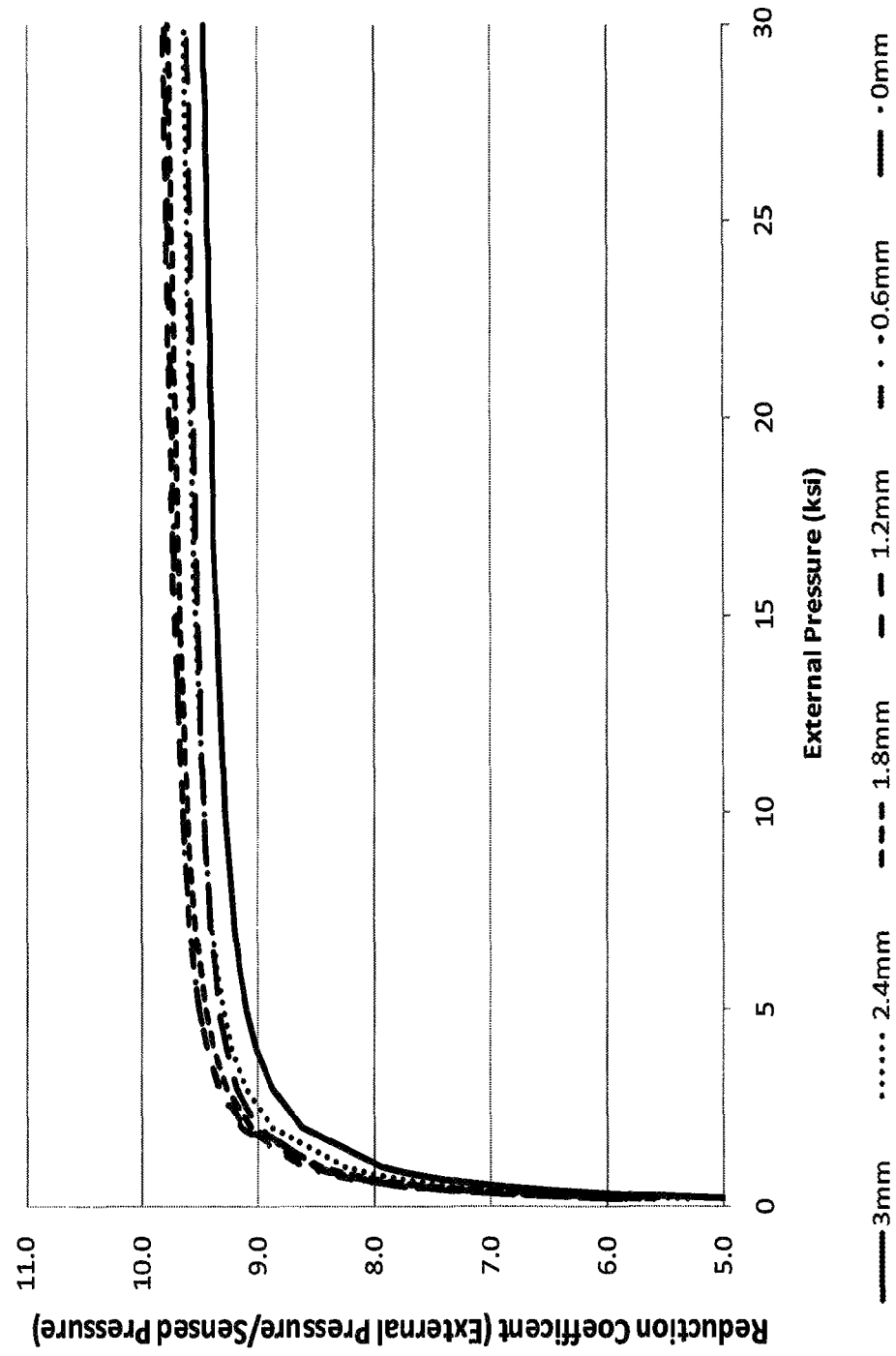
FIG. 8 is a graph showing simulation results of the various embodiments illustrated in FIG. 3 when the depth of only the third ring in the concentric ring arrangement is varied from 0 mm to 3.0 mm. The graph shows the reduction coefficient plotted against external pressure.

FIG. 8 is a graph showing simulation results of the various embodiments illustrated in FIG. 3 when the depth of only the third ring 308c, 408c and 508c in the concentric ring arrangement is varied from 0 mm to 3.0 mm. The depths of the remaining rings may be maintained at 3.0 mm. The temperature is kept constant at about 300° C. The reduction coefficient increases when the depth of the third ring decreases. The non-linearity of the reduction coefficient of rings at various depths is further reduced compared to the reduction coefficient shown in FIGS. 5b, 6 and 7.

FIG. 9 is a graph showing simulation results of the various embodiments illustrated in FIG. 3 when the depth of only the centre ring (or centre cylinder) 308d, 408d and 508d in the concentric ring arrangement is varied from 0 mm to 3.0 mm. The depths of the remaining rings are maintained at 3.0 mm. The temperature is kept constant at about 300° C. FIG. 9 shows that varying the depth of the centre ring do not have a significant effect on the reduction coefficient.

FIGS. 4b, 5b, as well as 6 to 9 show that a desired reduction coefficient can be obtained by defining the depth and/or width of any or part or all of the plurality of recesses 308. Furthermore, it is possible to predict the reduction coefficient by knowing the depth and width of the plurality of recesses 308. For instance, if the specified operating pressure is 10,000 to 30,000 psi and a multiple factor of 0.6 is selected for the second ring 308b, 408b and 508b, the depth will be 1.8 mm (0.6×3.0=1.8 mm) and the reduction coefficient will be about 11.

FIGS. 4b, 5b, as well as 6 to 9 also show that increasing the dimensions of the recesses and reducing the stiffness of the membrane 326 generally decreases the reduction coefficient. Varying the dimensions of recesses located in the peripheral region of the membrane 326 generally has a greater effect on reduction coefficient and linearity of the reduction coefficient than varying the dimensions of recesses located near the centre of the membrane 326.

For applications in which the operating environment has extremely high pressure, it is desirable to design the sensor device to have a high reduction coefficient. FIGS. 4b, 5b, as well as 6 to 9 show that the reduction coefficient tends to be high when the widths or the depths of the rings (or more generally recesses) are small. However, the non-linearity of the reduction coefficient tends to increase with decreasing values of widths or depths of the rings (or more generally recesses). Hence, there is a trade-off between reducing non-linearity and maintaining a low coefficient.

It may also be possible to adjust the widths of the plurality of recesses 306 to first set the baseline for the reduction coefficient. Varying the depths will then change the non-linearity and define the operating pressure for the sensor device.

FIG. 10 shows simulation results of the various embodiments illustrated in FIG. 3 when the depths of the centre, third, second and first rings are 3.0 mm, 3.0 mm, 3.0 mm and 2.7 mm, respectively and the widths of centre, third, second and first rings are 1.0 mm each. FIG. 10 shows the reduction coefficient plotted against external pressure ranging from 0 to 30,000 psi. Another simulation also shows that the reduction coefficient is stable with temperature.

A requirement for the sensor device to withstand an operating temperature of 300° C. and an operating pressure of 30,000 psi is set. An average reduction coefficient of 10.56 is achieved with a standard deviation of 0.026 across a temperature range from about 20° C. to about 330° C. and a pressure range of 200 to 300,000 psi. Other combinations of dimensions for the plurality of recesses can also be set to meet the same requirement.

FIG. 11 is a sideview schematic diagram showing a setup for testing the sensor device 600. The sensor device 600 is immersed in liquid 602 in a container 604. The liquid 602 allows the sensor device 600 to be immersed in a constant temperature bath such that the sensor device 600 is exposed to a constant temperature. In various embodiments, a suitable liquid 602 may be selected for the temperature bath up to temperatures of about 330° C. The liquid 602 may be silicone oil. External pressure is applied to the sensor device 600 using a pressure controller 606. The sensor device may be connected to the sensor device through a Saybolt Seconds Universal (SSU) pipe 608. The sensor may be mounted on the SSU pipe 608. In various embodiments, the pressure controller can generate an external pressure up to about 30,000 psi on the sensor device 600. The pressure controller 606 may be a silicone oil hydraulic pressure controller. Electrical connections 610 such as electrical cable or wirings provide an electrical connection from the sensor device 600 to an external device such as a computer such that the sensed pressure readings are transmitted to the external device.

For illustration purposes only and not as a limiting example, the term "substantially" may be quantified as a variance of +/−5% from the exact or actual. For example, the phrase "A is (at least) substantially the same as B" may encompass embodiments where A is exactly the same as B, or where A may be within a variance of +/−5%, for example of a value, of B, or vice versa.

In the context of various embodiments, the term "about" as applied to a numeric value encompasses the exact value and a variance of +/−5% of the value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A sensor device comprising
a sensor receiving portion; and
a sensor arranged in the sensor receiving portion; and
a cap covering the sensor and the sensor receiving portion, wherein the cap includes a plurality of recesses in an inner side wall of the cap.

2. The sensor device of claim 1, wherein the cap comprises a membrane where the plurality of recesses is located.

3. The sensor device of claim 1, wherein the cap includes at least one ring being at least a part of the plurality of recesses.

4. The sensor device of claim 3, wherein the cap includes a concentric ring arrangement, to which the at least one ring belongs, being at least a part of the plurality of recesses.

5. The sensor device of claim 3, wherein a width of the at least one ring is different from a width of another ring.

6. The sensor device of claim 3, wherein the width of the at least one ring ranges from around 0.01 mm to around 1.2 mm.

7. The sensor device of claim 1, wherein the recesses of the plurality of recesses have different depths.

8. The sensor device of claim 7, wherein the depths range between around 0.6 mm to around 3 mm from the cap surface.

9. The sensor device of claim 1, wherein the cap includes one or more elements, each having a shape selected from a group: circle, triangle, square and rectangle, being at least a part of the plurality of recesses.

10. The sensor device of claim 2, wherein the membrane comprises material that is different from the material of the remainder of the cap.

11. The sensor device of claim 1, further comprising a base where the sensor receiving portion is located.

12. The sensor device of claim 1, further comprising a sleeve in which the cap and the sensor receiving portion are disposed, the sleeve comprising an opening such that a region including the plurality of recesses is released via the opening.

13. The sensor device of claim 12, wherein the outer surface of the sleeve comprises a screw thread.

14. The sensor device of claim 12, wherein the sleeve is made from material having yield strength above 152500 psi.

15. The sensor device of claim 12, wherein the sleeve comprises stainless steel.

16. The sensor device of claim 11, wherein the cap is mounted on the sensor receiving portion such that the cap and the base completely encapsulate the sensor.

17. The sensor device of claim 1, further comprising a damping fluid in an enclosure around the sensor, the damping fluid having viscosity in the range of 50000 mPa·s to 1000000 mPa·s.

18. The sensor device of claim 17, wherein the damping fluid comprises silicone oil.

19. The sensor device of claim 1, wherein the cap is made from material with yield strength above 185200 psi and thermal conductivity below 7.50 W/m-K.

20. The sensor device of claim 1, wherein the cap comprises titanium beta 21.

21. The sensor device of claim 1, wherein the sensor receiving portion comprises ceramic material.

* * * * *